March 6, 1934.    J. S. WALCH    1,949,769
HEADLIGHT
Filed Dec. 20, 1932    2 Sheets-Sheet 1

INVENTOR.
Jacob S. Walch.
BY Townsend and Loftus.
ATTORNEYS.

March 6, 1934.  J. S. WALCH  1,949,769

HEADLIGHT

Filed Dec. 20, 1932  2 Sheets-Sheet 2

INVENTOR.
Jacob S. Walch.
BY Townsend and Loftus.
ATTORNEYS.

Patented Mar. 6, 1934

1,949,769

UNITED STATES PATENT OFFICE 1,949,769

HEADLIGHT

Jacob S. Walch, Oakland, Calif.

Application December 20, 1932, Serial No. 648,075

3 Claims. (Cl. 240—8.11)

This invention relates to headlights for motor vehicles and the like, and especially to an improved mounting or modification of the structure shown in my co-pending application entitled "Headlight", filed January 7, 1931, Serial No. 507,160.

The headlight disclosed in my co-pending application comprises a pair of long tubes disposed under the hood of an automobile, one on each side of the engine. The rear end of each tube is provided with a parabolic light reflector or the like and the forward end with a lens; the tubes being supported at the forward ends by side extensions on the radiator and at the rear ends by the dashboard. This method of supporting the tubes leaves them more or less permanently fixed in place, and as the tubes are disposed parallel to the motor and on each side thereof and are fairly large in diameter, they obstruct the carburetor and other parts of the motor when adjustments or minor repairs are necessary.

The object of the present invention is to generally improve and simplify the mounting of headlights of the character described so as to leave the opposite sides of the motor free and unobstructed when the hinged hood sections over the motor are raised; to provide a pair of headlights which are supported by the hood sections so that the headlights may be lifted in unison therewith; to provide means on each hood section for rigidly supporting the headlights and for adjusting or tilting them vertically so that the light beams projected by the headlights may be properly adjusted; and further, to provide a connection for each headlight which permits the usual raising and lowering of the hood sections, without disturbing the electric circuits to the headlights.

The manner of supporting the headlights with relation to the hood sections is shown in the accompanying drawings, in which—

Figure 1:
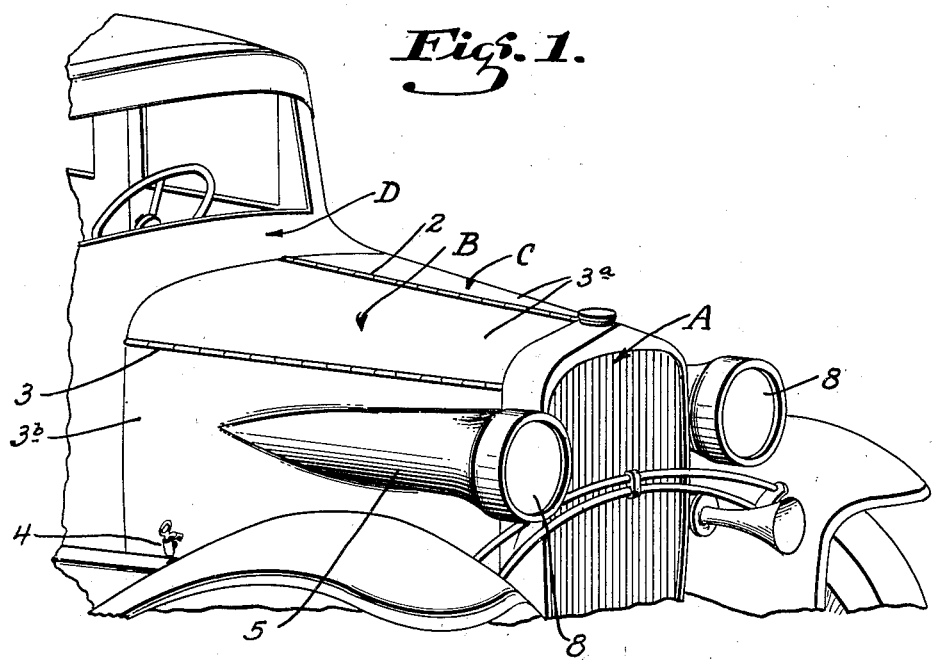
Fig. 1 is a perspective view of an automobile showing the headlights supported by the hood sections.
Figure 2:
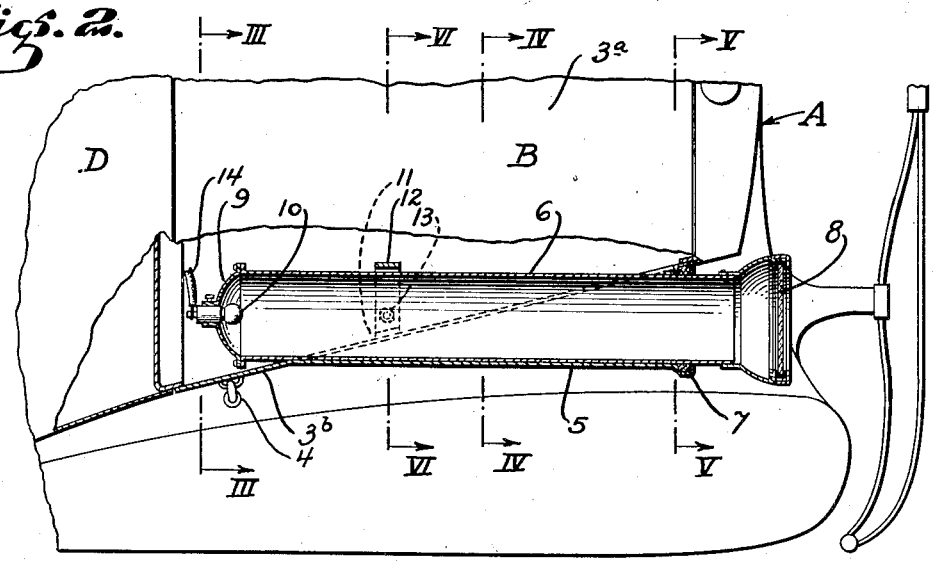
Fig. 2 is a partial plan view of the front end of an automobile, said view being broken away to show one of the hood sections and the lamp of said headlight supported thereby in section.

Referring to the drawings in detail, and particularly Figs. 1 and 2, A indicates the radiator of an automobile, B and C the hood sections covering the motor, and D the cowl or dash. The hood sections employed in the present instance are of standard construction, that is, a central hinge connection 2 is provided to permit the hood sections to be lifted and each hood section is divided and hingedly connected, as shown at 3, to permit each hood section to be partially folded when raised. The hood sections are identical in construction and the description of one will accordingly suffice.

Figure 3:
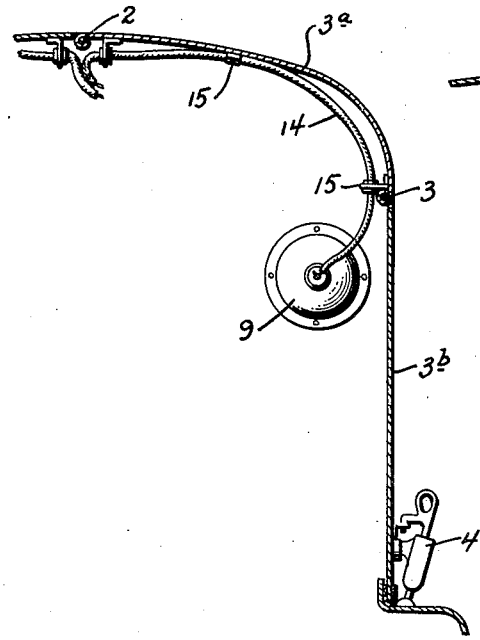
Fig. 3 is a cross section taken on line III—III of Fig. 2.
Figure 4:
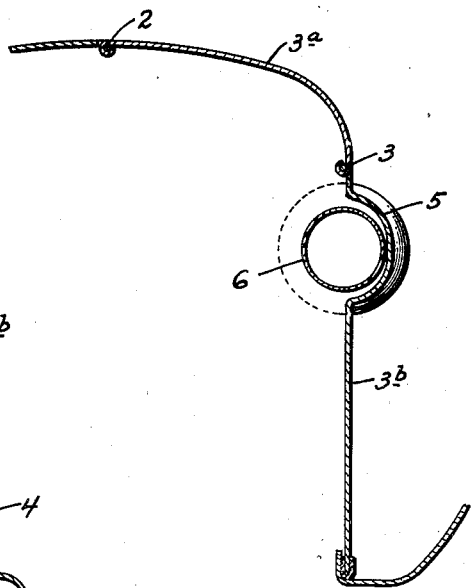
Fig. 4 is a cross section taken on line IV—IV of Fig. 2.
Figure 5:
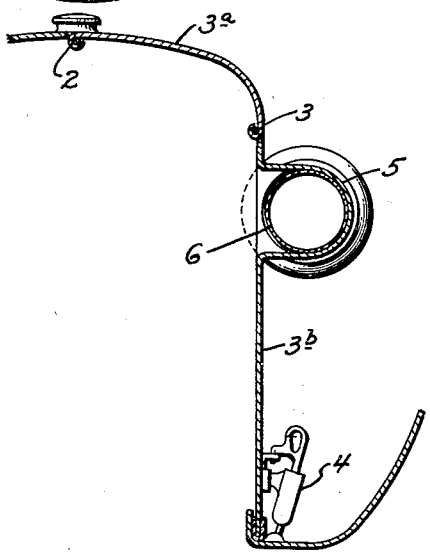
Fig. 5 is a cross section taken on line V—V of Fig. 2.
Figure 6:
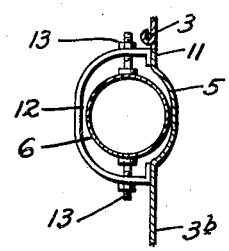
Fig. 6 is a cross section taken on line VI—VI of Fig. 2.

The upper section of the hood is indicated at 3a and the lower or vertical section at 3b, said sections being secured when lowered by the usual hooks or spring latches, indicated at 4, see Fig. 3. The vertical section 3b of the hood is also constructed according to standard practice with the exception that a bulge or extended portion 5 is provided to form a support for a tube 6. This tube forms a part of each headlight and is supported at the forward end of the hood section by a resilient gasket, or the like, as indicated at 7, see Fig. 2. A diffusing lens or the like 8 may be attached to the forward end of each tube and a parabolic reflector, or the like, at the rear end as indicated at 9; the usual incandescent bulb 10 being mounted in the parabolic reflector.

The headlight per se is fully disclosed and described in my co-pending application and for this reason will only be briefly referred to, as the improvement disclosed in the present application is not in the headlight itself but in the means of mounting and supporting the same.

The bulged or extended portion 5 formed on the vertical section of the hood is sufficiently large at the forward end to receive the supporting gasket 7 and to permit the tube to project therethrough. The hood is disposed on an angle as is usual and the bulged or extended portion therefore gradually tapers into the side of the hood, as clearly shown in Fig. 1. At the point indicated at 11, a bracket 12 is secured to the inner surface of the hood. The tube 6 projects through the bracket and it is held and secured with relation to the bracket by means of adjusting screws 13, there being two of them, one above and one below the tube. These screws serve two functions, first, that of supporting the rear end of the tube and the parabolic reflector 9 secured thereto, and secondly that of vertically adjusting the rear end of the tube so that the beam of light projected by the headlight may be properly adjusted. The lamp or headlight as a whole is thus rigidly secured to the hood and rattle and play between the lamp and the hood is prevented, first by the resilient gasket 7, and secondly by the adjusting screws 13 which rigidly engage and secure the opposite end of the headlights.

In view of the fact that the headlights are supported entirely by the hood sections, and also in view of the fact that these are raised and lowered whenever access is desired to the motor or parts connected therewith, it is essential that electric circuit connections be made that will not be disturbed when the hood is raised and lowered. This is readily accomplished by providing extension wires, such as shown at 14, see Fig. 3. These wires are connected to the rear end of the bulb 10, or the socket supporting the same, and they are then attached to the upper section of the hood indicated at 3a by clamps 15, the wires being finally run along the central hinge 2 to the battery, generator, or other source of supply. Such a connection permits each hood section to be raised or lowered without in any manner disturbing the electric circuit connections.

While the tubes 6 connecting the reflectors 9 and the lenses 8 are here shown as comparatively long, they may be entirely eliminated if desired, or may be made so short as to form nothing more or less than a housing between the reflector and the lens. But even though the tubes be of considerable length as here shown, they will in no way interfere with accessibility to the motor as they are raised completely out of the way when the hood sections are opened, hence the objection to the more or less permanent installations, as shown in my co-pending application, have been entirely eliminated. Furthermore, radiator design of any desired construction may be employed as the headlights are supported entirely independent of the radiator, hence doing away with side extensions on the same, and so on.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In an automobile having a compartment forwardly thereof, a pair of hood members one on each side, a hinged support about which said hood members are adapted to be swung to open and close said compartment, a headlight carried by and movable with each hood member, each said headlight comprising a tube, a lamp and reflector at the rear end of each said tube, and a lens at the forward end of each said tube, the rear ends of said tubes being within said compartment, said lenses being outside of said compartment.

2. In an automobile having an engine compartment forwardly thereof and a radiator forwardly of said compartment, a pair of hood members one on each side, a hinged support about which said hood members are adapted to be swung to open and close said compartment, a headlight carried by and movable with each hood member, each said headlight comprising a tube, a lamp and reflector at the rear end of each said tube, a lens at the forward end of each said tube, the rear ends of said tubes being within said compartment, said lenses being outside of said compartment, each said hood member having a tapered bulge, a bracket adjacent each bulge, adjusting means cooperating with said bracket to hold said headlights in adjusted positions in said bulges, and electric current conducting connections for the headlights swingable with the hood members without interruption of current flow through the headlights.

3. In an automobile having an engine compartment forwardly thereof and a radiator forwardly of said compartment, a pair of hood members one on each side, a hinged support about which said hood members are adapted to be swung to open and close said compartment, said compartment when closed tapering from narrower at the front thereof to wider at the rear thereof, a headlight carried by and movable with each hood member, each said headlight comprising a tube, a lamp and reflector at the rear end of each said tube, a lens at the forward end of each said tube, the rear ends of said tubes being within said compartment and adjacent the rear end thereof, said lenses being outside of said compartment and forwardly of said radiator, each said hood member having a tapered bulge, a bracket adjacent each bulge, adjusting means cooperating with said bracket to hold said headlights in adjusted positions in said bulges, and electric current conducting connections for the headlights swingable with the hood members without interruption of current flow through the headlights.

JACOB S. WALCH.